US012230468B2

(12) United States Patent
Kirkham et al.

(10) Patent No.: US 12,230,468 B2
(45) Date of Patent: Feb. 18, 2025

(54) X-RAY SYSTEM WITH FIELD EMITTERS AND ARC PROTECTION

(71) Applicant: Varex Imaging Corporation, Salt Lake City, UT (US)

(72) Inventors: Dave Kirkham, South Jordan, UT (US); Colton B. Woodman, Magna, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 154 days.

(21) Appl. No.: 17/855,739

(22) Filed: Jun. 30, 2022

(65) Prior Publication Data

US 2024/0006144 A1 Jan. 4, 2024

(51) Int. Cl.

*H01J 35/06* (2006.01)
*H01J 35/08* (2006.01)
*H01J 35/14* (2006.01)

(52) U.S. Cl.

CPC ........... *H01J 35/065* (2013.01); *H01J 35/112* (2019.05); *H01J 35/147* (2019.05)

(58) Field of Classification Search

CPC ...... H01J 35/065; H01J 35/112; H01J 35/147; H01J 35/066; H01J 35/04; H01J 35/045

See application file for complete search history.

(56) References Cited

U.S. PATENT DOCUMENTS

RE28,544 E 9/1975 Stein
4,203,036 A 5/1980 Tschunt
4,219,733 A 8/1980 Tschunt
4,274,005 A 6/1981 Yamamura et al.
4,347,624 A 8/1982 Tschunt
4,592,080 A 5/1986 Rauch et al.
4,606,061 A 8/1986 Ramamurti
4,788,705 A 11/1988 Anderson (Continued)

FOREIGN PATENT DOCUMENTS

CN 102543635 7/2012
CN 106783488 5/2017

(Continued)

OTHER PUBLICATIONS

Nagao et al., Dependence of emission characteristics of Spindt-type field emitters on cathode material panel, Applied Surface Science, vol. 146, Issues 1-4, May 1999, 182-186.

(Continued)

*Primary Examiner* — Kiho Kim

(74) *Attorney, Agent, or Firm* — Laurence & Phillips IP Law

(57) ABSTRACT

An x-ray tube, comprising: a field emitter including an emission surface; an anode; and a focus electrode disposed between the field emitter and the anode; wherein: the focus electrode includes: a first surface that is substantially perpendicular to the field emitter emission surface and nearest to the field emitter; a second surface that is axially nearest to the anode, wherein the field emitter and the anode form an axis; and a third surface that extends between the first surface and the second surface; and a first location on the focus electrode between the first surface and the third surface is further from the anode than a second location on the focus electrode between the third surface and the second surface.

20 Claims, 5 Drawing Sheets

(56) References Cited

U.S. PATENT DOCUMENTS

| | | | | |
|---|---|---|---|---|
| 4,819,256 | A | 4/1989 | Annis et al. | |
| 4,821,305 | A | 4/1989 | Anderson | |
| 4,857,799 | A | 8/1989 | Spindt et al. | |
| 4,877,554 | A | 10/1989 | Honma et al. | |
| 4,914,681 | A | 4/1990 | Klingenbeck et al. | |
| 5,015,912 | A | 5/1991 | Spindt et al. | |
| 5,022,062 | A | 6/1991 | Annis | |
| RE33,634 | E | 7/1991 | Yanaki | |
| 5,125,012 | A | 6/1992 | Schittenhelm | |
| 5,149,584 | A | 9/1992 | Baker et al. | |
| 5,150,394 | A | 9/1992 | Karellas | |
| 5,153,900 | A | 10/1992 | Nomikos et al. | |
| 5,164,972 | A | 11/1992 | Krumme | |
| 5,179,581 | A | 1/1993 | Annis | |
| 5,179,583 | A | 1/1993 | Oikawa | |
| 5,181,234 | A | 1/1993 | Smith | |
| 5,191,600 | A | 3/1993 | Vincent et al. | |
| 5,193,105 | A | 3/1993 | Rand et al. | |
| 5,195,112 | A | 3/1993 | Vincent et al. | |
| 5,200,985 | A | 4/1993 | Miller | |
| 5,241,577 | A | 8/1993 | Burke et al. | |
| 5,243,252 | A | 9/1993 | Kaneko et al. | |
| 5,247,556 | A | 9/1993 | Eckert et al. | |
| 5,268,955 | A | 12/1993 | Burke et al. | |
| 5,274,690 | A | 12/1993 | Burke et al. | |
| 5,291,538 | A | 3/1994 | Burke et al. | |
| 5,305,363 | A | 4/1994 | Burke et al. | |
| 5,313,511 | A | 5/1994 | Annis et al. | |
| 5,378,408 | A | 1/1995 | Carroll et al. | |
| 5,384,820 | A | 1/1995 | Burke | |
| 5,413,866 | A | 5/1995 | Baker et al. | |
| 5,438,605 | A | 8/1995 | Burke et al. | |
| 5,458,784 | A | 10/1995 | Baker et al. | |
| 5,465,284 | A | 11/1995 | Karellas | |
| 5,475,729 | A | 12/1995 | Mattson et al. | |
| 5,493,599 | A | 2/1996 | Mattson | |
| 5,504,791 | A | 4/1996 | Hell et al. | |
| 5,548,630 | A | 8/1996 | Hell et al. | |
| 5,567,357 | A | 10/1996 | Wakita | |
| 5,581,591 | A | 12/1996 | Burke et al. | |
| 5,591,312 | A | 1/1997 | Smalley | |
| 5,618,875 | A | 4/1997 | Baker et al. | |
| 5,642,394 | A | 6/1997 | Rothschild | |
| 5,644,612 | A | 7/1997 | Moorman et al. | |
| 5,653,951 | A | 8/1997 | Rodriguez et al. | |
| 5,726,524 | A | 3/1998 | Debe | |
| 5,729,583 | A | 3/1998 | Tang et al. | |
| 5,748,701 | A * | 5/1998 | Mika | H01J 35/045 378/138 |
| 5,763,886 | A | 6/1998 | Schulte | |
| 5,764,683 | A | 6/1998 | Swift et al. | |
| 5,768,337 | A | 6/1998 | Anderson | |
| 5,773,921 | A | 6/1998 | Keesmann et al. | |
| 5,854,822 | A | 12/1998 | Chornenky et al. | |
| 5,864,146 | A | 1/1999 | Karellas | |
| 5,869,922 | A | 2/1999 | Tolt | |
| 5,892,231 | A | 4/1999 | Baylor et al. | |
| 5,977,697 | A | 11/1999 | Jin et al. | |
| 5,995,586 | A | 11/1999 | Jahnke | |
| 6,009,141 | A | 12/1999 | Hell et al. | |
| 6,018,562 | A | 1/2000 | Willson | |
| 6,019,656 | A | 2/2000 | Park et al. | |
| 6,031,892 | A | 2/2000 | Karellas | |
| 6,057,637 | A | 5/2000 | Zettl et al. | |
| 6,074,893 | A | 6/2000 | Nakata et al. | |
| 6,094,472 | A | 7/2000 | Smith | |
| 6,097,138 | A | 8/2000 | Nakamoto | |
| 6,118,852 | A | 9/2000 | Rogers et al. | |
| 6,146,230 | A | 11/2000 | Kim et al. | |
| 6,156,433 | A | 12/2000 | Hatori et al. | |
| 6,181,765 | B1 | 1/2001 | Sribar et al. | |
| 6,195,411 | B1 | 2/2001 | Dinsmore | |
| 6,225,225 | B1 | 5/2001 | Goh et al. | |
| 6,236,709 | B1 | 5/2001 | Perry et al. | |
| 6,239,547 | B1 | 5/2001 | Uemura et al. | |
| 6,250,984 | B1 | 6/2001 | Jin et al. | |
| 6,252,925 | B1 | 6/2001 | Wang et al. | |
| 6,259,765 | B1 | 7/2001 | Baptist | |
| 6,277,318 | B1 | 8/2001 | Bower et al. | |
| 6,280,697 | B1 | 8/2001 | Zhou et al. | |
| 6,282,260 | B1 | 8/2001 | Grodzins | |
| 6,312,303 | B1 | 11/2001 | Yaniv et al. | |
| 6,320,933 | B1 | 11/2001 | Grodzins et al. | |
| 6,331,194 | B1 | 12/2001 | Sampayan et al. | |
| 6,333,444 | B1 | 12/2001 | Ellis et al. | |
| 6,333,968 | B1 | 12/2001 | Whitlock et al. | |
| 6,334,939 | B1 | 1/2002 | Zhou et al. | |
| 6,356,570 | B1 | 3/2002 | Alon et al. | |
| 6,359,383 | B1 | 3/2002 | Chuang et al. | |
| 6,379,745 | B1 | 4/2002 | Kydd et al. | |
| 6,385,292 | B1 | 5/2002 | Dunham et al. | |
| 6,409,567 | B1 | 6/2002 | Amey, Jr. et al. | |
| 6,422,450 | B1 | 7/2002 | Zhou et al. | |
| 6,424,695 | B1 | 7/2002 | Grodzins et al. | |
| 6,436,221 | B1 | 8/2002 | Chang et al. | |
| 6,440,761 | B1 | 8/2002 | Choi | |
| 6,445,767 | B1 | 9/2002 | Karellas | |
| 6,456,691 | B2 | 9/2002 | Takahashi et al. | |
| 6,473,487 | B1 | 10/2002 | Le | |
| 6,504,292 | B1 | 1/2003 | Choi et al. | |
| 6,514,395 | B2 | 2/2003 | Zhou et al. | |
| 6,542,580 | B1 | 4/2003 | Carver et al. | |
| 6,553,096 | B1 | 4/2003 | Zhou et al. | |
| 6,597,760 | B2 | 7/2003 | Beneke et al. | |
| RE38,223 | E | 8/2003 | Keesmann et al. | |
| 6,616,497 | B1 | 9/2003 | Choi et al. | |
| 6,630,772 | B1 | 10/2003 | Bower et al. | |
| 6,646,382 | B2 | 11/2003 | Tanabe | |
| 6,653,588 | B1 | 11/2003 | Gillard-Hickman | |
| 6,661,867 | B2 | 12/2003 | Mario et al. | |
| 6,661,875 | B2 | 12/2003 | Greenwald et al. | |
| 6,661,876 | B2 | 12/2003 | Turner et al. | |
| 6,664,722 | B1 | 12/2003 | Yaniv et al. | |
| 6,665,373 | B1 | 12/2003 | Kotowski et al. | |
| 6,674,837 | B1 | 1/2004 | Taskar et al. | |
| 6,717,174 | B2 | 4/2004 | Karellas | |
| 6,718,012 | B2 | 4/2004 | Ein-Gal | |
| 6,731,716 | B2 | 5/2004 | Mihara et al. | |
| 6,739,932 | B2 | 5/2004 | Yaniv et al. | |
| 6,741,025 | B2 | 5/2004 | Tuck et al. | |
| 6,760,407 | B2 | 7/2004 | Price et al. | |
| 6,763,083 | B2 | 7/2004 | Fernandez | |
| 6,768,534 | B2 | 7/2004 | Iwase et al. | |
| RE38,561 | E | 8/2004 | Keesmann et al. | |
| 6,785,360 | B1 | 8/2004 | Annis | |
| 6,787,122 | B2 | 9/2004 | Zhou | |
| 6,798,127 | B2 | 9/2004 | Mao et al. | |
| 6,799,075 | B1 | 9/2004 | Chornenky et al. | |
| 6,806,629 | B2 | 10/2004 | Sung | |
| 6,807,248 | B2 | 10/2004 | Mihara et al. | |
| 6,809,465 | B2 | 10/2004 | Jin | |
| 6,812,426 | B1 | 11/2004 | Kotowski et al. | |
| 6,815,790 | B2 | 11/2004 | Bui et al. | |
| 6,839,403 | B1 | 1/2005 | Kotowski et al. | |
| 6,843,599 | B2 | 1/2005 | Le et al. | |
| 6,850,595 | B2 | 2/2005 | Zhou et al. | |
| 6,856,667 | B2 | 2/2005 | Ellengogen | |
| 6,858,521 | B2 | 2/2005 | Jin | |
| 6,859,518 | B2 | 2/2005 | Banchieri et al. | |
| 6,864,162 | B2 | 3/2005 | Jin | |
| 6,876,724 | B2 | 4/2005 | Zhou et al. | |
| 6,912,268 | B2 | 6/2005 | Price et al. | |
| 6,928,141 | B2 | 8/2005 | Carver et al. | |
| 6,937,689 | B2 | 8/2005 | Zhao et al. | |
| 6,943,507 | B2 | 9/2005 | Winkler et al. | |
| 6,947,522 | B2 | 9/2005 | Wilson et al. | |
| 6,949,873 | B2 | 9/2005 | Sung | |
| 6,950,495 | B2 | 9/2005 | Nelson et al. | |
| 6,965,199 | B2 | 11/2005 | Stoner et al. | |
| 6,968,034 | B2 | 11/2005 | Ellengogen | |
| 6,969,536 | B1 | 11/2005 | Tuck et al. | |
| 6,969,690 | B2 | 11/2005 | Zhou et al. | |
| 6,975,703 | B2 | 12/2005 | Wilson et al. | |
| 6,980,627 | B2 | 12/2005 | Qiu et al. | |

(56) References Cited

U.S. PATENT DOCUMENTS

| | | | |
|---|---|---|---|
| 7,012,266 | B2 | 3/2006 | Jin |
| 7,014,743 | B2 | 3/2006 | Zhou et al. |
| 7,016,459 | B2 | 3/2006 | Ellenbogen et al. |
| 7,016,461 | B2 | 3/2006 | Rotondo et al. |
| 7,016,471 | B2 | 3/2006 | Kindlein |
| 7,020,242 | B2 | 3/2006 | Ellenbogen |
| 7,027,560 | B2 | 4/2006 | Kindlein |
| 7,039,154 | B1 | 5/2006 | Ellenbogen et al. |
| 7,049,814 | B2 | 5/2006 | Mann |
| 7,065,175 | B2 | 6/2006 | Green |
| 7,068,749 | B2 | 6/2006 | Kollegal et al. |
| 7,072,436 | B2 | 7/2006 | Pelc |
| 7,072,440 | B2 | 7/2006 | Mario et al. |
| 7,082,182 | B2 | 7/2006 | Zhou et al. |
| 7,085,351 | B2 | 8/2006 | Lu et al. |
| 7,085,352 | B2 | 8/2006 | Dunham |
| 7,092,482 | B2 | 8/2006 | Besson |
| 7,092,485 | B2 | 8/2006 | Kravis |
| 7,099,434 | B2 | 8/2006 | Adams et al. |
| 7,103,137 | B2 | 9/2006 | Seppi et al. |
| 7,110,493 | B1 | 9/2006 | Kotowski et al. |
| 7,123,681 | B2 | 10/2006 | Ellenbogen et al. |
| 7,123,689 | B1 | 10/2006 | Wilson |
| 7,125,308 | B2 | 10/2006 | Fink |
| 7,129,513 | B2 | 10/2006 | Zhou et al. |
| 7,137,860 | B2 | 11/2006 | Ahn et al. |
| 7,142,629 | B2 | 11/2006 | Edie et al. |
| 7,145,981 | B2 | 12/2006 | Pelc |
| 7,145,988 | B2 | 12/2006 | Price et al. |
| 7,147,894 | B2 | 12/2006 | Zhou et al. |
| 7,154,992 | B2 | 12/2006 | Schuster |
| 7,161,285 | B2 | 1/2007 | Okamoto et al. |
| 7,164,747 | B2 | 1/2007 | Ellenbogen et al. |
| 7,177,390 | B2 | 2/2007 | Martin et al. |
| 7,177,391 | B2 | 2/2007 | Chapin et al. |
| 7,180,981 | B2 | 2/2007 | Wang |
| 7,183,963 | B2 | 2/2007 | Lee et al. |
| 7,185,828 | B2 | 3/2007 | Igashira et al. |
| 7,187,755 | B2 | 3/2007 | Dunham et al. |
| 7,192,031 | B2 | 3/2007 | Dunham et al. |
| 7,195,938 | B2 | 3/2007 | Yaniv et al. |
| 7,197,116 | B2 | 3/2007 | Dunham et al. |
| 7,203,269 | B2 | 4/2007 | Huber et al. |
| 7,206,379 | B2 | 4/2007 | Lemaitre |
| 7,215,740 | B2 | 5/2007 | Fukushima et al. |
| 7,215,741 | B2 | 5/2007 | Ukita |
| 7,218,700 | B2 | 5/2007 | Huber et al. |
| 7,218,704 | B1 | 5/2007 | Adams et al. |
| 7,218,707 | B2 | 5/2007 | Holm |
| 7,220,971 | B1 | 5/2007 | Chang et al. |
| 7,224,765 | B2 | 5/2007 | Ellenbogen |
| 7,227,923 | B2 | 6/2007 | Edic et al. |
| 7,227,924 | B2 | 6/2007 | Zhou et al. |
| 7,233,101 | B2 | 6/2007 | Jin |
| 7,233,644 | B1 | 6/2007 | Bendahan et al. |
| 7,235,912 | B2 | 6/2007 | Sung |
| 7,244,063 | B2 | 7/2007 | Eberhard et al. |
| 7,245,692 | B2 | 7/2007 | Lu et al. |
| 7,245,755 | B1 | 7/2007 | Pan et al. |
| 7,252,749 | B2 | 8/2007 | Zhou et al. |
| 7,255,757 | B2 | 8/2007 | Subramanian et al. |
| 7,257,189 | B2 | 8/2007 | Modica et al. |
| 7,261,466 | B2 | 8/2007 | Bhatt et al. |
| 7,274,768 | B2 | 9/2007 | Green |
| 7,276,844 | B2 | 10/2007 | Bouchard et al. |
| 7,279,686 | B2 | 10/2007 | Schneiker |
| 7,280,631 | B2 | 10/2007 | Man et al. |
| 7,283,609 | B2 | 10/2007 | Possin et al. |
| 7,294,248 | B2 | 11/2007 | Gao |
| 7,295,651 | B2 | 11/2007 | Delgado et al. |
| 7,317,278 | B2 | 1/2008 | Busta |
| 7,319,733 | B2 | 1/2008 | Price et al. |
| 7,319,734 | B2 | 1/2008 | Besson et al. |
| 7,319,735 | B2 | 1/2008 | Defreitas et al. |
| 7,319,736 | B2 | 1/2008 | Rotondo et al. |
| 7,321,653 | B2 | 1/2008 | Hockersmith et al. |
| 7,322,745 | B2 | 1/2008 | Agrawal et al. |
| 7,324,627 | B2 | 1/2008 | Harding |
| 7,324,629 | B2 | 1/2008 | Fukushima et al. |
| 7,326,328 | B2 | 2/2008 | Hudspeth et al. |
| 7,327,826 | B2 | 2/2008 | Hanke et al. |
| 7,327,829 | B2 | 2/2008 | Chidester |
| 7,327,830 | B2 | 2/2008 | Zhang et al. |
| 7,330,531 | B1 | 2/2008 | Karellas |
| 7,330,532 | B2 | 2/2008 | Winsor |
| 7,330,533 | B2 | 2/2008 | Sampayon |
| 7,330,535 | B2 | 2/2008 | Arenson et al. |
| 7,330,832 | B1 | 2/2008 | Gray et al. |
| 7,332,416 | B2 | 2/2008 | Bristol et al. |
| 7,332,736 | B2 | 2/2008 | Jin |
| 7,333,587 | B2 | 2/2008 | Man et al. |
| 7,333,592 | B2 | 2/2008 | Nonoguchi et al. |
| 7,336,769 | B2 | 2/2008 | Arenson et al. |
| 7,338,487 | B2 | 3/2008 | Chornenky et al. |
| 7,340,029 | B2 | 3/2008 | Popescu |
| 7,342,233 | B2 | 3/2008 | Danielsson et al. |
| 7,343,002 | B1 | 3/2008 | Lee et al. |
| 7,346,146 | B2 | 3/2008 | Rütten et al. |
| 7,346,147 | B2 | 3/2008 | Kirk et al. |
| 7,346,148 | B2 | 3/2008 | Ukita |
| 7,348,621 | B2 | 3/2008 | Moore |
| 7,349,525 | B2 | 3/2008 | Morton et al. |
| 7,352,841 | B2 | 4/2008 | Ellenbogen et al. |
| 7,352,846 | B2 | 4/2008 | Kuribayashi et al. |
| 7,352,887 | B2 | 4/2008 | Besson |
| 7,355,330 | B2 | 4/2008 | Burden et al. |
| 7,356,113 | B2 | 4/2008 | Wu et al. |
| 7,356,122 | B2 | 4/2008 | Raber et al. |
| 7,358,658 | B2 | 4/2008 | Sung |
| 7,359,479 | B2 | 4/2008 | Oikawa et al. |
| 7,359,484 | B2 | 4/2008 | Qiu et al. |
| 7,359,485 | B2 | 4/2008 | Ohsawa |
| 7,359,486 | B2 | 4/2008 | Subraya et al. |
| 7,359,487 | B1 | 4/2008 | Newcome |
| 7,362,847 | B2 | 4/2008 | Bijjani |
| 7,366,279 | B2 | 4/2008 | Edic et al. |
| 7,366,280 | B2 | 4/2008 | Lounsberry |
| 7,366,283 | B2 | 4/2008 | Carlson et al. |
| 7,369,640 | B2 | 5/2008 | Seppi et al. |
| 7,369,643 | B2 | 5/2008 | Kotowski et al. |
| 7,382,857 | B2 | 6/2008 | Engel |
| 7,382,862 | B2 | 6/2008 | Bard et al. |
| 7,382,864 | B2 | 6/2008 | Hebert et al. |
| 7,386,095 | B2 | 6/2008 | Okada et al. |
| 7,388,940 | B1 | 6/2008 | Man et al. |
| 7,388,944 | B2 | 6/2008 | Hempel et al. |
| 7,394,923 | B2 | 7/2008 | Zou et al. |
| 7,403,590 | B2 | 7/2008 | Possin et al. |
| 7,403,595 | B2 | 7/2008 | Kim et al. |
| 7,406,156 | B2 | 7/2008 | Lenz |
| 7,409,039 | B2 | 8/2008 | Banchieri et al. |
| 7,409,043 | B1 | 8/2008 | Dunham et al. |
| 7,418,077 | B2 | 8/2008 | Gray |
| 7,424,095 | B2 | 9/2008 | Mildner et al. |
| 7,428,297 | B2 | 9/2008 | Eilbert |
| 7,428,298 | B2 | 9/2008 | Bard et al. |
| 7,429,371 | B2 | 9/2008 | Diner et al. |
| 7,431,500 | B2 | 10/2008 | Deych et al. |
| 7,440,537 | B2 | 10/2008 | Ellenbogen et al. |
| 7,440,543 | B2 | 10/2008 | Morton |
| 7,440,544 | B2 | 10/2008 | Scheinman et al. |
| 7,443,949 | B2 | 10/2008 | Defreitas et al. |
| 7,444,011 | B2 | 10/2008 | Pan et al. |
| 7,446,474 | B2 | 11/2008 | Moldonado et al. |
| 7,447,298 | B2 | 11/2008 | Busta et al. |
| 7,449,081 | B2 | 11/2008 | Bouchard et al. |
| 7,449,082 | B2 | 11/2008 | Roach |
| 7,455,757 | B2 | 11/2008 | Oh et al. |
| 7,460,647 | B2 | 12/2008 | Weiss et al. |
| 7,463,721 | B2 | 12/2008 | Harding et al. |
| 7,466,072 | B2 | 12/2008 | Nam et al. |
| 7,469,040 | B2 | 12/2008 | Holm et al. |
| 7,483,510 | B2 | 1/2009 | Carver et al. |
| 7,486,772 | B2 | 2/2009 | Lu et al. |

(56) References Cited

U.S. PATENT DOCUMENTS

| | | | |
|---|---|---|---|
| 7,489,763 | B2 | 2/2009 | Lenz |
| 7,492,868 | B2 | 2/2009 | Gorrell et al. |
| 7,496,179 | B2 | 2/2009 | Freudenberger et al. |
| 7,502,442 | B2 | 3/2009 | Hooper et al. |
| 7,505,556 | B2 | 3/2009 | Chalmers et al. |
| 7,505,557 | B2 | 3/2009 | Modica et al. |
| 7,505,562 | B2 | 3/2009 | Dinca et al. |
| 7,505,563 | B2 | 3/2009 | Morton et al. |
| 7,508,122 | B2 | 3/2009 | Huber |
| 7,508,910 | B2 | 3/2009 | Safai et al. |
| 7,512,215 | B2 | 3/2009 | Morton et al. |
| 7,515,688 | B2 | 4/2009 | Harding |
| 7,517,149 | B2 | 4/2009 | Agrawal et al. |
| 7,519,151 | B1 | 4/2009 | Shukla et al. |
| 7,526,065 | B2 | 4/2009 | Hardesty |
| 7,526,069 | B2 | 4/2009 | Matsumura et al. |
| 7,529,344 | B2 | 5/2009 | Oreper |
| 7,558,374 | B2 | 7/2009 | Lemaitre |
| 7,561,666 | B2 | 7/2009 | Annis |
| 7,564,938 | B2 | 7/2009 | Tesic et al. |
| 7,564,939 | B2 | 7/2009 | Morton et al. |
| 7,567,647 | B1 | 7/2009 | Maltz |
| 7,579,077 | B2 | 8/2009 | Dubrow et al. |
| 7,580,500 | B2 | 8/2009 | Forster et al. |
| 7,583,791 | B2 | 9/2009 | Hockersmith et al. |
| 7,606,348 | B2 | 10/2009 | Foland et al. |
| 7,606,349 | B2 | 10/2009 | Oreper et al. |
| 7,608,974 | B2 | 10/2009 | Sung |
| 7,609,806 | B2 | 10/2009 | Defreitas et al. |
| 7,609,807 | B2 | 10/2009 | Leue et al. |
| 7,616,731 | B2 | 11/2009 | Pack et al. |
| 7,618,300 | B2 | 11/2009 | Liu et al. |
| 7,625,545 | B2 | 12/2009 | Nishi et al. |
| 7,627,087 | B2 | 12/2009 | Zou et al. |
| 7,634,047 | B2 | 12/2009 | Popescu et al. |
| 7,639,775 | B2 | 12/2009 | DeMan et al. |
| 7,660,391 | B2 | 2/2010 | Oreper et al. |
| 7,664,222 | B2 | 2/2010 | Jabri et al. |
| 7,664,230 | B2 | 2/2010 | Morton et al. |
| 7,672,422 | B2 | 3/2010 | Seppi et al. |
| 7,684,538 | B2 | 3/2010 | Morton et al. |
| 7,702,068 | B2 | 4/2010 | Scheinman et al. |
| 7,706,499 | B2 | 4/2010 | Pack et al. |
| 7,706,508 | B2 | 4/2010 | Arenson et al. |
| 7,724,868 | B2 | 5/2010 | Morton |
| 7,731,810 | B2 | 6/2010 | Subramanian et al. |
| 7,736,209 | B2 | 6/2010 | Mao et al. |
| 7,742,563 | B2 | 6/2010 | Edic et al. |
| 7,751,528 | B2 | 7/2010 | Zhou et al. |
| 7,760,849 | B2 | 7/2010 | Zhang |
| 7,771,117 | B2 | 8/2010 | Kim et al. |
| 7,778,391 | B2 | 8/2010 | Fuerst et al. |
| 7,803,574 | B2 | 9/2010 | Desai et al. |
| 7,809,109 | B2 | 10/2010 | Mastronardi et al. |
| 7,809,114 | B2 | 10/2010 | Zou et al. |
| 7,826,589 | B2 | 11/2010 | Kotowski et al. |
| 7,826,595 | B2 | 11/2010 | Liu et al. |
| 7,831,012 | B2 | 11/2010 | Foland et al. |
| 7,834,530 | B2 | 11/2010 | Manohara et al. |
| 7,835,486 | B2 | 11/2010 | Basu et al. |
| 7,850,874 | B2 | 12/2010 | Lu et al. |
| 7,864,917 | B2 | 1/2011 | Ribbing et al. |
| 7,864,924 | B2 | 1/2011 | Ziskin et al. |
| 7,869,566 | B2 | 1/2011 | Edic et al. |
| 7,875,469 | B2 | 1/2011 | Busta |
| 7,876,879 | B2 | 1/2011 | Morton |
| 7,885,375 | B2 | 2/2011 | Man et al. |
| 7,887,689 | B2 | 2/2011 | Zhou et al. |
| 7,899,156 | B2 | 3/2011 | Oreper et al. |
| 7,902,736 | B2 | 3/2011 | Hudspeth et al. |
| 7,903,781 | B2 | 3/2011 | Foland et al. |
| 7,903,789 | B2 | 3/2011 | Morton et al. |
| 7,924,975 | B2 | 4/2011 | Zhang et al. |
| 7,929,663 | B2 | 4/2011 | Morton |
| 7,936,858 | B2 | 5/2011 | Hashemi et al. |
| 7,949,101 | B2 | 5/2011 | Morton |
| 7,965,812 | B2 | 6/2011 | Hanke et al. |
| 7,965,816 | B2 | 6/2011 | Kravis et al. |
| 7,970,099 | B2 | 6/2011 | Fadler |
| 7,972,616 | B2 | 7/2011 | Dubrow et al. |
| 7,983,381 | B2 | 7/2011 | David et al. |
| 8,002,958 | B2 | 8/2011 | Zhou et al. |
| 8,005,191 | B2 | 8/2011 | Jaafar et al. |
| 8,019,047 | B2 | 9/2011 | Birnbach |
| 8,021,045 | B2 | 9/2011 | Foos et al. |
| 8,026,674 | B2 | 9/2011 | Berk et al. |
| 8,031,834 | B2 | 10/2011 | Ludwig et al. |
| 8,059,783 | B2 | 11/2011 | Oreper et al. |
| 8,066,967 | B2 | 11/2011 | Eberlein et al. |
| 8,070,906 | B2 | 12/2011 | Bouchard et al. |
| 8,094,781 | B1 | 1/2012 | Safai et al. |
| 8,098,794 | B1 | 1/2012 | Fernandez |
| 8,135,110 | B2 | 3/2012 | Morton |
| 8,155,262 | B2 | 4/2012 | Zhou et al. |
| 8,155,272 | B2 | 4/2012 | Eilbert et al. |
| 8,304,595 | B2 | 11/2012 | Daniels et al. |
| 8,319,002 | B2 | 11/2012 | Daniels et al. |
| 8,345,819 | B2 | 1/2013 | Mastronardi et al. |
| 8,351,575 | B2 | 1/2013 | Vogtmeier |
| 8,447,013 | B2 | 5/2013 | Sprenger et al. |
| 8,488,737 | B2 | 7/2013 | Boese et al. |
| 8,503,605 | B2 | 8/2013 | Morton et al. |
| 8,529,798 | B2 | 9/2013 | Bouchard et al. |
| 8,532,259 | B2 | 9/2013 | Shedlock et al. |
| 8,654,919 | B2 | 2/2014 | Sabol et al. |
| 8,692,230 | B2 | 4/2014 | Zhou et al. |
| 8,724,872 | B1 | 5/2014 | Ziskin et al. |
| 8,778,716 | B2 | 7/2014 | Zhou et al. |
| 8,824,632 | B2 | 9/2014 | Mastronardi |
| 8,956,637 | B2 | 2/2015 | Dubrow et al. |
| 2001/0009970 | A1 | 7/2001 | Chornenky et al. |
| 2001/0025962 | A1 | 10/2001 | Nakamoto |
| 2002/0006489 | A1 | 1/2002 | Goth et al. |
| 2002/0063500 | A1 | 5/2002 | Keren |
| 2002/0074932 | A1 | 6/2002 | Bouchard et al. |
| 2002/0085674 | A1 | 7/2002 | Price et al. |
| 2002/0189400 | A1 | 12/2002 | Kodas et al. |
| 2003/0002627 | A1 | 1/2003 | Espinosa et al. |
| 2003/0002628 | A1* | 1/2003 | Wilson .................. H01J 35/065 378/138 |
| 2003/0023592 | A1 | 1/2003 | Modica et al. |
| 2003/0092207 | A1 | 5/2003 | Yaniv et al. |
| 2003/0210764 | A1 | 11/2003 | Tekletsadik et al. |
| 2004/0013597 | A1 | 1/2004 | Mao et al. |
| 2004/0018371 | A1 | 1/2004 | Mao |
| 2004/0025732 | A1 | 2/2004 | Tuck et al. |
| 2004/0036402 | A1 | 2/2004 | Keesmann et al. |
| 2004/0070326 | A1 | 4/2004 | Mao et al. |
| 2004/0191698 | A1 | 9/2004 | Yagi et al. |
| 2004/0198892 | A1 | 10/2004 | Busta et al. |
| 2004/0213378 | A1 | 10/2004 | Zhou et al. |
| 2004/0218714 | A1 | 11/2004 | Faust |
| 2004/0224081 | A1 | 11/2004 | Sheu et al. |
| 2004/0240616 | A1 | 12/2004 | Qiu et al. |
| 2004/0256975 | A1 | 12/2004 | Gao et al. |
| 2005/0001528 | A1 | 1/2005 | Mao et al. |
| 2005/0025280 | A1 | 2/2005 | Schulte |
| 2005/0038498 | A1 | 2/2005 | Dubrow et al. |
| 2005/0094769 | A1 | 5/2005 | Heismann et al. |
| 2005/0105685 | A1 | 5/2005 | Harding |
| 2005/0108926 | A1 | 5/2005 | Moy et al. |
| 2005/0112048 | A1 | 5/2005 | Tsakalakos et al. |
| 2005/0129178 | A1 | 6/2005 | Pettit |
| 2005/0129858 | A1 | 6/2005 | Jin et al. |
| 2005/0148174 | A1 | 7/2005 | Unger et al. |
| 2005/0157179 | A1 | 7/2005 | Cha et al. |
| 2005/0200261 | A1 | 9/2005 | Mao et al. |
| 2005/0225228 | A1 | 10/2005 | Burden et al. |
| 2005/0226364 | A1 | 10/2005 | Man et al. |
| 2005/0231091 | A1 | 10/2005 | Bouchard et al. |
| 2005/0232844 | A1 | 10/2005 | Diner et al. |
| 2005/0244991 | A1 | 11/2005 | Mao et al. |
| 2006/0018432 | A1 | 1/2006 | Zhou et al. |
| 2006/0041104 | A1 | 2/2006 | Ait-Haddou et al. |

(56) References Cited

U.S. PATENT DOCUMENTS

2006/0049741 A1 3/2006 Bouchard et al.
2006/0054866 A1 3/2006 Ait-Haddou et al.
2006/0066202 A1 3/2006 Manohara et al.
2006/0159916 A1 7/2006 Dubrow et al.
2006/0163996 A1 7/2006 Tuck et al.
2006/0204738 A1 9/2006 Dubrow et al.
2006/0216412 A1 9/2006 Chen
2006/0226763 A1 10/2006 Moon et al.
2006/0246810 A1 11/2006 Lee et al.
2006/0252163 A1 11/2006 Yaniv et al.
2006/0274889 A1 12/2006 Lu et al.
2007/0007142 A1 1/2007 Zhou et al.
2007/0009081 A1 1/2007 Zhou et al.
2007/0009088 A1 1/2007 Edic et al.
2007/0014148 A1 1/2007 Zhou et al.
2007/0018045 A1 1/2007 Callahan et al.
2007/0030955 A1 2/2007 Eilbert et al.
2007/0042667 A1 2/2007 Sung
2007/0046166 A1 3/2007 Okada et al.
2007/0086574 A1 4/2007 Lenz
2007/0126312 A1 6/2007 Sung
2007/0133747 A1 6/2007 Manak et al.
2007/0160758 A1 7/2007 Roach
2007/0189459 A1 8/2007 Eaton et al.
2007/0237300 A1* 10/2007 Kim ...................... H01J 35/065 378/122
2007/0247048 A1 10/2007 Zhang et al.
2007/0247049 A1 10/2007 Li et al.
2007/0257592 A1 11/2007 Li et al.
2007/0284533 A1 12/2007 Green
2008/0019485 A1 1/2008 Weiss et al.
2008/0029145 A1 2/2008 Sung
2008/0043920 A1* 2/2008 Liu ...................... H01J 35/065 378/138
2008/0063140 A1 3/2008 Awad
2008/0069420 A1 3/2008 Zhang et al.
2008/0074026 A1 3/2008 Sakai et al.
2008/0099339 A1 5/2008 Zhou et al.
2008/0118030 A1 5/2008 Lee et al.
2008/0130831 A1 6/2008 Rotondo et al.
2008/0199626 A1 8/2008 Zhou et al.
2008/0206448 A1 8/2008 Mao et al.
2008/0232545 A1 9/2008 Wu et al.
2008/0253521 A1 10/2008 Boyden et al.
2008/0267354 A1 10/2008 Holm et al.
2008/0299864 A1 12/2008 Bouchard et al.
2009/0022264 A1 1/2009 Zhou et al.
2009/0041198 A1 2/2009 Price et al.
2009/0052615 A1 2/2009 Ribbing et al.
2009/0104834 A1 4/2009 Bouchard et al.
2009/0116617 A1 5/2009 Mastronardi et al.
2009/0185661 A1 7/2009 Zou et al.
2009/0245468 A1 10/2009 Zou et al.
2009/0285353 A1 11/2009 Ellenbogen et al.
2009/0316860 A1 12/2009 Okunuki et al.
2010/0034450 A1 2/2010 Mertelmeier
2010/0052511 A1 3/2010 Keesmann
2010/0140160 A1 6/2010 Dubrow et al.
2010/0140213 A1 6/2010 Mizukami et al.
2010/0189223 A1 7/2010 Eaton et al.
2010/0226479 A1 9/2010 Beyerlein et al.
2010/0285972 A1 11/2010 Dubrow et al.
2010/0322498 A1 12/2010 Wieczorek et al.
2010/0329413 A1 12/2010 Zhou et al.
2011/0002441 A1 1/2011 Vogtmeier et al.
2011/0002442 A1 1/2011 Thran et al.
2011/0007874 A1 1/2011 Vogtmeier
2011/0044546 A1 2/2011 Pan et al.
2011/0075802 A1 3/2011 Beckmann et al.
2011/0075814 A1 3/2011 Boese et al.
2011/0096903 A1 4/2011 Singh
2011/0101302 A1 5/2011 Zhou et al.
2011/0116603 A1 5/2011 Kim et al.
2011/0142204 A1 6/2011 Zou et al.
2011/0142316 A1 6/2011 Wang et al.
2011/0170663 A1 7/2011 Boese et al.
2011/0170757 A1 7/2011 Pan et al.
2011/0211666 A1 9/2011 Mng et al.
2011/0311019 A1 12/2011 Ribbing et al.
2012/0033791 A1 2/2012 Mastronardi
2012/0286692 A1 11/2012 Beckmann et al.
2012/0288066 A1 11/2012 Kang et al.
2012/0318987 A1 12/2012 Miyazaki et al.
2013/0101090 A1 4/2013 Schubert et al.
2013/0129046 A1 5/2013 Yamazaki et al.
2013/0170611 A1 7/2013 Beckmann et al.
2013/0195248 A1 8/2013 Rothschild et al.
2013/0202089 A1 8/2013 Schubert et al.
2013/0208857 A1 8/2013 Arodzero et al.
2013/0313964 A1 11/2013 Iwai et al.
2013/0343520 A1 12/2013 Grodzins et al.
2014/0098937 A1 4/2014 Bendahan
2014/0112455 A1 4/2014 Matsuda
2014/0133629 A1 5/2014 Morton
2014/0362976 A1 12/2014 Matsumoto et al.
2015/0078532 A1 3/2015 Tsinghua et al.
2017/0162359 A1 6/2017 Tang et al.
2019/0341218 A1 11/2019 Takahashi et al.
2020/0170097 A1 5/2020 Tan et al.
2020/0179009 A1 6/2020 Zhang et al.
2024/0006144 A1* 1/2024 Kirkham ............... H01J 35/065

FOREIGN PATENT DOCUMENTS

EP 1020888 7/2000
EP 2945181 11/2015
JP 2007265981 10/2007
JP 2009009942 1/2009
JP 2013245292 12/2013
KR 20100123253 11/2010
WO 1994015350 7/1994
WO 1994015352 7/1994
WO 1994028571 12/1994
WO 1999031702 6/1999
WO 2001093292 12/2001
WO 2002041348 5/2002
WO 2003084865 10/2003
WO 2004049373 6/2004
WO 2004099068 11/2004
WO 2004102604 11/2004
WO 2006130630 12/2006

OTHER PUBLICATIONS

Zhang et al., Stationary scanning x-ray source based on carbon nanotube field emitters, Applied Physics Letters 86, 184104 (2005).
Zhang et al., A multi-beam X-ray imaging system based on carbon nanotube field emitters, Medical Imaging 2006: Physics of Medical Imaging, Proceedings of the SPIE-The International Society for Optical Engineering, vol. 6142, 614204-1 to 614204-8 (2006).
Sarrazin et al., Carbon-nanotube field emission X-ray tube for space exploration XRD/XRF instrument, International Centre for Diffraction Data 2004, Advances in X-ray Analysis, vol. 47 232-239.
Senda et al., New field-emission x-ray radiography system, Review of Scientific Instruments, vol. 75, No. 5, 1366-1368, May 2004.
Sugie et al., Carbon nanotubes as electron source in an x-ray tube, Applied Physics Letters vol. 78, No. 17, 2578-2580 (2001).
Qian et al., Design and characterization of a spatially distributed multibeam field emission x-ray source for stationary digital breast tomosynthesis, Med Phys. 36(10): 4389-4399 (Oct. 2009).
Chen et al., Theoretical Study of a 0.22 THz Backward Wave Oscillator Based on a Dual-Gridded, Carbon-Nanotube Cold Cathode, Appl. Sci. 2018, 8, 2462.
Zhu et al., Field emission properties of diamond and carbon nanotubes, Diamond and Related Materials, vol. 10, Issues 9-10, 1709-1713, Sep.-Oct. 2001.
Japanese Patent Application No. 2021-104291, Decision of Rejection dated Jan. 4, 2023 (with English translation).
JP2021-104291, Amendment dated Apr. 25, 2023 (with English translation).

(56) References Cited

OTHER PUBLICATIONS

JP2021-104291, Notice of Appeal dated Apr. 25, 2023 (with English translation).
JP2021-104291, Notice of Transfer of a case for reconsideration by examiners before appeal proceedings dated Jun. 29, 2023 (with English translation).
JP2021-104291, Reconsideration report by examiner before appeal dated Jul. 19, 2023 (with English translation).
JP2021-104291, Written statement dated Jul. 19, 2023 (with English translation).
JP2021-104291, Notice of termination of reconsideration by examiners before appeal proceedings dated Jul. 21, 2023 (with English translation).
EP Patent Application No. 20 183 282.1, Extended Search Report dated Mar. 25, 2022.
EP Patent Application No. 20 183 282.1, Response dated Oct. 4, 2022.
EP Appl. No. 23181800, European Search Report dated Oct. 26, 2023.

* cited by examiner

X-RAY SYSTEM WITH FIELD EMITTERS AND ARC PROTECTION

X-ray tubes used within x-ray systems may include field emitters. Field emitters may be particularly susceptible to arcing due to the structure of the field emitters. An arc that impacts the field emitter may degrade or destroy the structure and eventually render the x-ray tube inoperable.

DETAILED DESCRIPTION

Some embodiments relate to x-ray systems and x-ray tubes with field emitters and arc protection. Field emitters may be particularly susceptible to arcing and damage due to the structure. The relative size of field emitters may otherwise increase an electric field strength at the field emitter. The increased electric field strength may increase a probability that an arc may occur and may increase a probability that the arc occurs on the field emitter. As will be described in further detail below, position and structure of a focus electrode may reduce a probability that an arc may occur on the field emitter and cause damage. In addition, if an arc occurs, the likely position of the arc may be controlled to be further from the field emitter. As a result, a probability that the x-ray tube may remain operable after an arc may increase.

Figure 1:
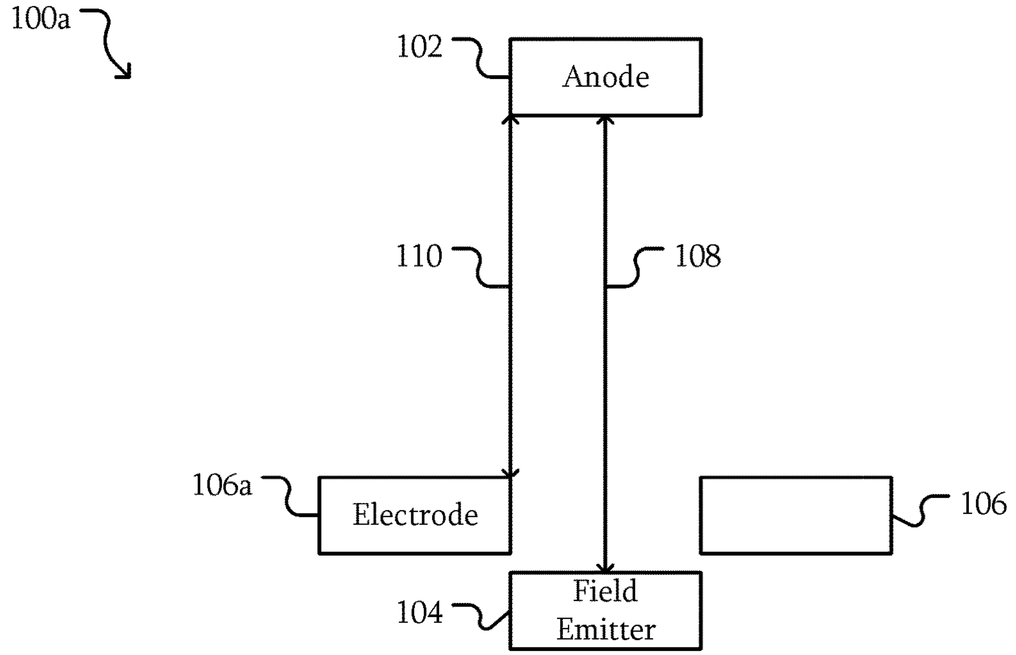
FIG. 1 is a block diagram of an x-ray tube according to some embodiments.

FIG. 1 is a block diagram of an x-ray tube according to some embodiments. The x-ray tube 100*a* includes an anode 102, a field emitter 104, and a focus electrode 106*a*. The anode 102 includes a structure configured to generate x-rays in response to incident electrons. The field emitter 104 is configured to generate an electron beam that may be directed towards the anode 102. The field emitter 104 may include a variety of types of emitters. For example, the field emitter 104 may include a nanotube emitter, a nanowire emitter, a Spindt array, or the like. Conventionally, nanotubes have at least a portion of the structure that has a hollow center, where nanowires or nanorods has a substantially solid core. For simplicity in use of terminology, as used herein, nanotube also refers to nanowire and nanorod. A nanotube refers to a nanometer-scale (nm-scale) tube-like structure with an aspect ratio of at least 100:1 (length:width or diameter). A Spindt array may include individual field emitters with small sharp cones using an electron generating material, such as molybdenum (Mo) or Tungsten (W). In some embodiments, the field emitter 104 is formed of an electrically conductive or semi-conductive material with a high tensile strength and high thermal conductivity such as carbon, metal oxides (e.g., $Al_2O_3$, titanium oxide ($TiO_2$), zinc oxide (ZnO), or manganese oxide ($Mn_xO_y$, where x and y are integers)), metals, sulfides, nitrides, and carbides, either in pure or in doped form, or the like.

In some embodiments, the field emitter 104 may include multiple field emitters. For example, the field emitter 104 may include, tens to hundreds or more of individual field emitters 104. Each field emitter 104 may be configured to generate an electron beam directed towards the anode 102. Each field emitter 104 may be associated with corresponding focus electrodes 106, such as the focus electrodes pair 106*a*, 106 shown in FIG. 1, or a corresponding opening of a unitary focus electrode 106.

Field emitters 104 may have areas that are larger relative to other types of emitters. For example, a field emitter 104 may have length of about 10 millimeters (mm) to about 30 mm and a width from about 2 mm to about 6 mm. In an example, the length of the field emitter 104 is at least 5 times larger than the width. The larger relative area may result in a larger size of a focal spot on the anode 102. Heating of the anode 102 due to incident electrons on the focal spot may be spread over that larger area, decreasing the thermal stress on the anode 102, permitting a higher electron flux, or the like. In addition, field emitters 104 may have a relatively lower current flux as compared to other emitters. To compensate for the lower flux, the area of the field emitter 104 may be increased. These aspects lead to larger relative areas for field emitters 104. The larger relative area means that the local field strength around the field emitter 104 is more sensitive to the anode 102 or tube voltage.

The larger relative area of a field emitter 104 may increase a probability of an arc. As the area of the field emitter 104 increases, a relative position of another structure that may receive an arc is moved further away from the anode 102, decreasing the electric field strength on those structures relative to the electric field strength at the field emitter 104. As a result, a probability that an arc may occur at the field emitter 104 may increase. Field emitters 104 may be more sensitive to arcing than other types of emitters, such as thermionic emitters, due to their structure. For example, field emitters 104 may include relatively small structures, such as a thin layer, that may be damaged by an arc.

Accordingly, field emitters have competing design issues. The field emitter 104 may be larger in area due to its nature and due to a desired larger focal spot for distributed heating. However, that increased area increases the probability of arcing occurring on the field emitter 104.

The focus electrode 106*a* may alleviate the increased probability of arcing occurring on the field emitter 104. As a result, benefits of the larger area of a field emitter 104 may be realized while the probability of damage to the field emitter 104 due to arcing is reduced. The focus electrode 106*a* is disposed between the anode 102 and the field emitter 104. The focus electrode 106*a* is configured to adjust the size and/or shape of the focal spot on the anode 102. At least part of the focus electrode 106*a* is closer to the anode 102 than any part of the field emitter 104. For example, a shortest distance between any part of the field emitter 104 and any part of the anode 102 may be distance 108. A shortest distance from part of the focus electrode 106*a* to the anode 102 may be distance 110. Distance 110 is less than distance 108.

Due to the distance 110 to the focus electrode 106*a* being shorter than the distance 108 to the field emitter 104, the electric field strength at the focus electrode 106*a* may be greater than the electric field strength at the field emitter 104. As a result, a probability that an arc will occur on the field emitter 104 may be decreased while a probability that an arc will occur on the focus electrode 106*a* may increase.

In some embodiments, the focus electrode 106*a* is disposed relative to the field emitter 104 and the anode 102 and shaped such that during operation, a point of highest electric field strength on a cathode structure is closer to the focus electrode 106*a* than the field emitter 104. The cathode structure may include structures that are at or near the potential of the field emitter 104. For example, the anode 102 may be at about 10-50 kilovolts (kV), about 50-150 kV, about 50-450 kV or the like (relative to the cathode structure or ground). In some embodiments, these voltages may be associated with particular applications, such as mammography, medical diagnostic imaging, industrial imaging, explosive detection, non-destructive testing (NDT), or the like. The cathode structure, such as the field emitter 104, the focus electrode 106*a*, a grid (not illustrated), or the like may be at voltages from about −3 kV to about 1 kV. Generally, a higher electric field strength may increase the probability of an arc. As a result, the design of an x-ray tube 100*a* may include minimizing local electric field strength maxima. However, in some embodiments, the point of highest electric field strength can be created by design and, in particular, offset or shifted away from the field emitter 104. In some embodiments, the electric field strength at the point of highest electric field strength may be greater than about 8 times the highest electric field strength on the field emitter 104. In some embodiments, the structure of the focus electrode 106*a* may result in the electric field strength at the point of highest electric field strength being at least about 25% higher than the electric field strength on a portion of the focus electrode 106*a* closest to the field emitter 104.

Figure 2:
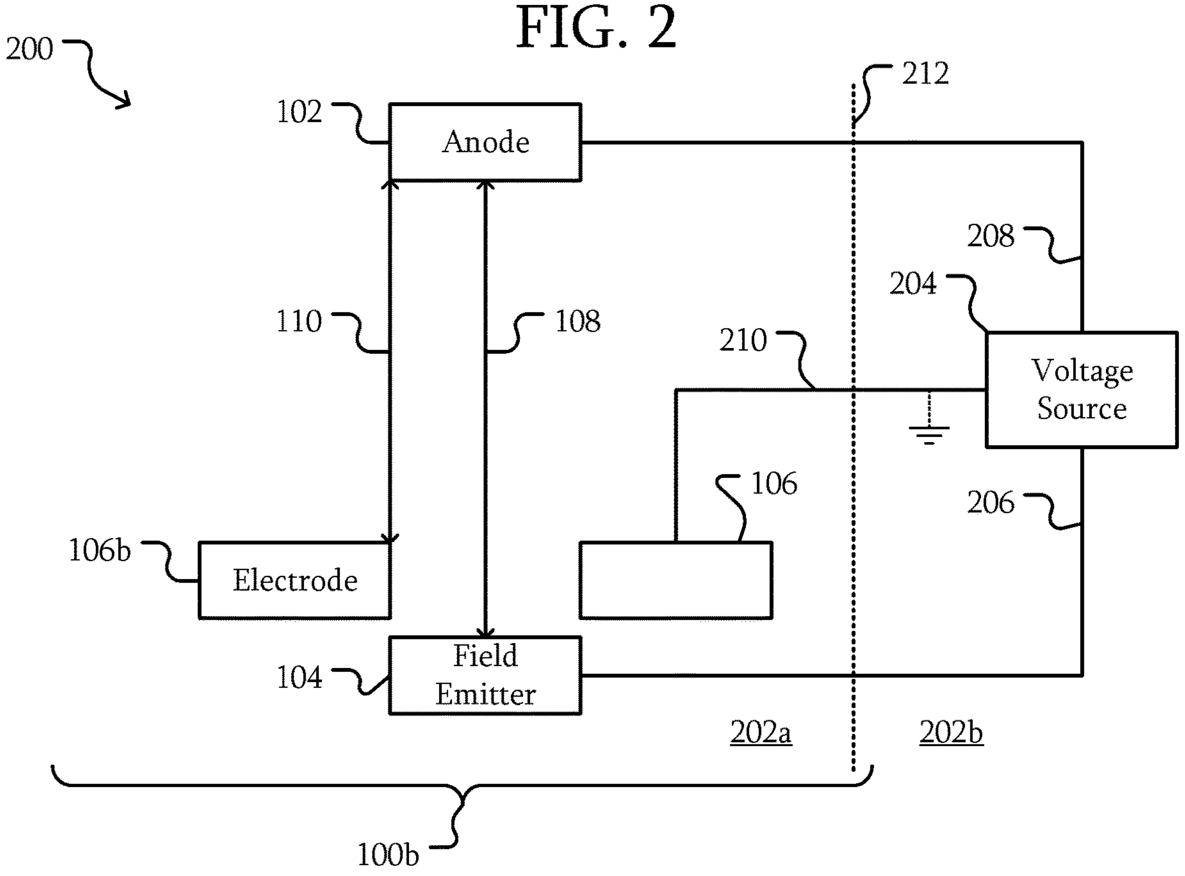
FIG. 2 is a block diagram of an x-ray system according to some embodiments.

FIG. 2 is a block diagram of an x-ray system according to some embodiments. The x-ray system 200 may include an x-ray tube 100*b* similar to x-ray tube 100*a* described above. The x-ray tube 100*b* may include a vacuum enclosure 212 where the anode 102, field emitter 104, and the focus electrode 106*b* are disposed in an interior 202*a* of the vacuum enclosure 212.

The x-ray system 200 may include a voltage source 204 disposed on an exterior 202*b* of the vacuum enclosure 212. The voltage source 204 may be configured to generate multiple voltages for the x-ray system 200. For example, the voltage source 204 may be configured to generate one or more voltages 206 for the field emitter 104, a high voltage 208 for the anode 102, a focus electrode voltage 210 for the focus electrode 106, or the like.

In some embodiments, the focus electrode 106*b* may be grounded. That is the focus electrode volage 210 may be 0 V or near 0 V. Portions of the vacuum enclosure 212, a housing for the x-ray tube 100*b*, or the like may be grounded. The focus electrode 106*b* may share that ground. In some embodiments, the voltage source 204 may share that ground. As a result, arcs that discharge through the focus electrode 106*b* may direct the charge to ground.

In some embodiments, the focus electrode 106*b* may be at a voltage 210 different from ground. For example, the voltage source 204 may be configured to apply a variable voltage to the focus electrode 106*b*. The voltage source 204 may include spark gap protectors or other circuitry to allow for the desired variability in the focus electrode voltage 210 while still accommodating arcs that may occur.

Figure 3:
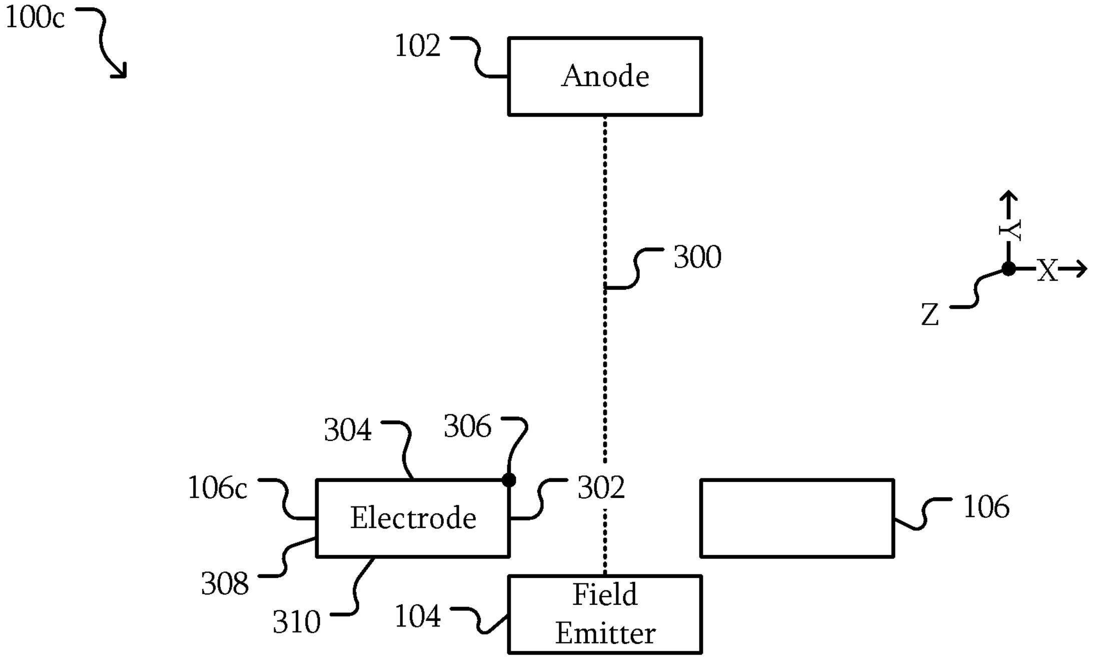
FIG. 3 is a block diagram of an x-ray tube with a two surface electrode according to some embodiments.

FIG. 3 is a block diagram of an x-ray tube with a two surface electrode according to some embodiments, where two surfaces 302, 306 of the focus electrode have a higher electric field strength than two other surfaces 308, 310 that face away from the anode. The x-ray tube 100*c* may be similar to the x-ray tubes 100*a-b*. However, the focus electrode 106*c* may have a particular structure.

The focus electrode 106*c* may have a structure relative to an axis 300. The field emitter 104 and the anode 102 may form the axis 300. The axis 300 may be aligned in the general direction of the electrons emitted from the field emitter 104 traveling towards the anode 102. In this example, the axis 300 may extend along the Y axis. A component that extends axially relative to the axis 300 may have some component along the Y axis. In some embodiments, an axially extending component may extend only axially or only along the Y axis while other axially extending components may have some part that extends radially, i.e., perpendicular to the axis 300 or the Y axis parallel to the X-Z plane, extends along the X axis, extends along the Z axis, or the like.

The focus electrode 106*c* includes at least two surfaces. Here, two surfaces 302 and 304 are used as an example. The first surface (or field emitter perpendicular surface or beam shaping surface) 302 extends substantially parallel to the axis 300 or an emission surface of the field emitter 104. The surface 302 may include the beam shaping surface with a structure that shapes a focal spot on the anode 102 when operating. The surface 302 may contribute to a majority of the shaping of the electric field to focus electrons from the field emitter 104 on the anode 102. Other surfaces, such as surface 304 may have some impact, but the relative contribution of surface 304 is less than that of surface 302.

The second surface (or anode facing parallel surface) 304 of the focus electrode 106*c* extends radially away from the first surface 302 from the axis. In some embodiments, the second surface 304 is formed to extend only radially away parallel to the X-Z plane from the first surface 302 without a substantial axial component. As a result, the location 306 where the first surface 302 and the second surface join may be about a 90 degree angle. The second surface 304 may be a surface that is nearest to the anode 102. During operation, a point of highest electric field strength is disposed where the first surface 302 joins the second surface 304. As the focus electrode 106*c* may be at the same potential, an electric field strength along surface 302 may be necessarily less than that of the location 306 where the first surface 302 and the second surface 304 join. In addition, the relatively sharp feature of the location 306 may increase the local electric field strength, as electric fields concentrate around the corners or edges of conductors in the field. As a result, an arc that may occur can have an increased probability of occurring at location 306 rather than on the field emitter 104.

Although a 90 degree angle has been used as an example, in other embodiments, the angle may be different. For example, the angle may be larger or smaller in a range such that a local maximum of electric field strength on cathode structures occurs at the location 306.

Figure 4:
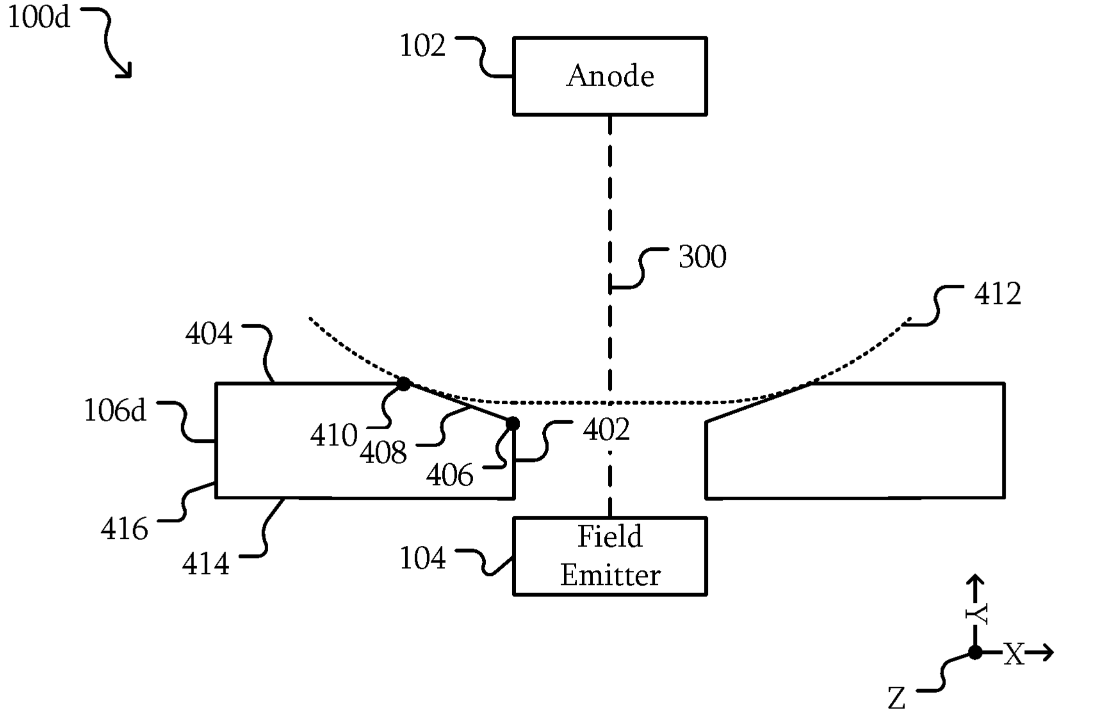
FIG. 4 is a block diagram of an x-ray tube with a three surface electrode according to some embodiments.

FIG. 4 is a block diagram of an x-ray tube with a three surface electrode according to some embodiments, where three surfaces 402, 404, 406 of the focus electrode have a higher electric field strength than other surfaces 414, 416 that face away from the anode. The x-ray tube 100*d* may be similar to the x-ray tubes 100*a-c*. However, the focus electrode 106 may include at least three surfaces with a higher electric field strength. A first surface (or field emitter perpendicular surface or beam shaping surface) 402 may be similar to the first surface 302 of focus electrode 106*c* of x-ray tube 100*c*. The first surface 402 may be a beam shaping surface that affects the focal spot.

A third surface (or anode facing surface) 408 may extend radially parallel to the X-Z plane away from the first surface 402 and is joined to the first surface 402 at location (or inner angle or inner corner) 406 similar to the second surface 304 of focus electrode 106*c*. However, the third surface 408 also extends axially away from the first surface 402 relative to the axis 300 along the Y axis. In this embodiment, the axial extension of the third surface 408 is in a direction towards the anode. As a result, the angle of the first surface 402 and the third surface 408 at location 406 may be greater than 90 degrees. If the angle at location 406 is greater, the electric field strength at location 406 may be reduced relative to an angle of 90 degrees. Similar to the first surface 402, the third surface 408 is a beam shaping surface and helps to shape the electron beam to a desired cross section with a desired trajectory on a focal spot on the anode 102 when operating.

In addition, the focus electrode includes a second surface (or anode facing parallel surface) 404. The second surface 404 joins the third surface 408 at location (or outer angle or outer corner) 410. The second surface 404 extends away from the third surface 408 relative to the axis 300. The resulting structure allows for both control of the focal spot through surface 402, but also positioning of a point of higher electric field strength further away from the field emitter 104 by the angle at location 406, the length of the third surface 404, and the angle at location 410.

For example, line 412 is a point equidistant from the anode 102. Location 410 where the third surface 408 joints the second surface 404 may be at the equidistant line 412. However, the location 406 may be further from the anode 102 than the equidistant line 412. As a result, an electric field strength at the location 406 may be lower than the electric field strength at the location 410. A point of highest electric field strength may be disposed at location 410 where the third surface 408 joins the second surface 404.

In addition, the angle of the second surface 404 to the third surface 408 at location 410 may be determined such that other points along the second surface 404 are further from the anode 102 than the point 410. As a result, an electric field strength along the surface 404 may be less than the electric field strength at the location 410. The electric field strength along the focus electrode 106*d* may be a local maximum at the location 410. Any arcing may occur at the location 410, rather than other locations along the focus electrode 106*d* including those closer to the field emitter 104. Due to the close proximity of location 306 (FIG. 3) relative to the field emitter, arcing at the highest electric field strength location 306 may still leak or arc to surrounding features, such as the field emitter 104 causing damage to the field emitter 104. Moving the highest electric field strength to the location 410 (FIG. 4) away from the field emitter 104, reduces the likelihood that arcing at the highest electric field strength location 410 will leak or arc to the field emitter 104, thus reducing the likelihood of damage to the field emitter 104 due to arcing. For a similar sized focus electrodes 106*c*, 106*d* at a similar distance away from the anode 102, the location 306 (FIG. 3) with a sharper or narrower angle can be closer to the anode 102 with a higher electric field strength than the location 410 (FIG. 4) with a wider angle, so the focus electrodes 106*c* can have improved beam shaping and focusing characteristics but with an increased likelihood of arcs and damage to the cathode structures, such as field emitters 104, caused by arcs.

In some embodiments, the part or location (e.g., 410) of the focus electrode 106*d* that is closer to the anode 102 (e.g., with the highest electric field strength) than any part of the field emitter 104 is further from a center of the field emitter 104 than another part of the focus electrode 106*d* (e.g., 402, 406, 408). For example, beam shaping surfaces of the focus electrode 106*d*, such as surface 402 that face the electron beam, may be closer to a center of the field emitter 104 than that part or location (e.g., 410) of the focus electrode 106*d* (with the highest electric field strength). As the focus electrode 106*d* may be at a single potential, the electric field strength will be higher at the part or location (e.g., 410) of the focus electrode 106*d* that is closer to the anode 102 than the beam shaping surfaces (e.g., 402, 404, 408).

Figure 5:
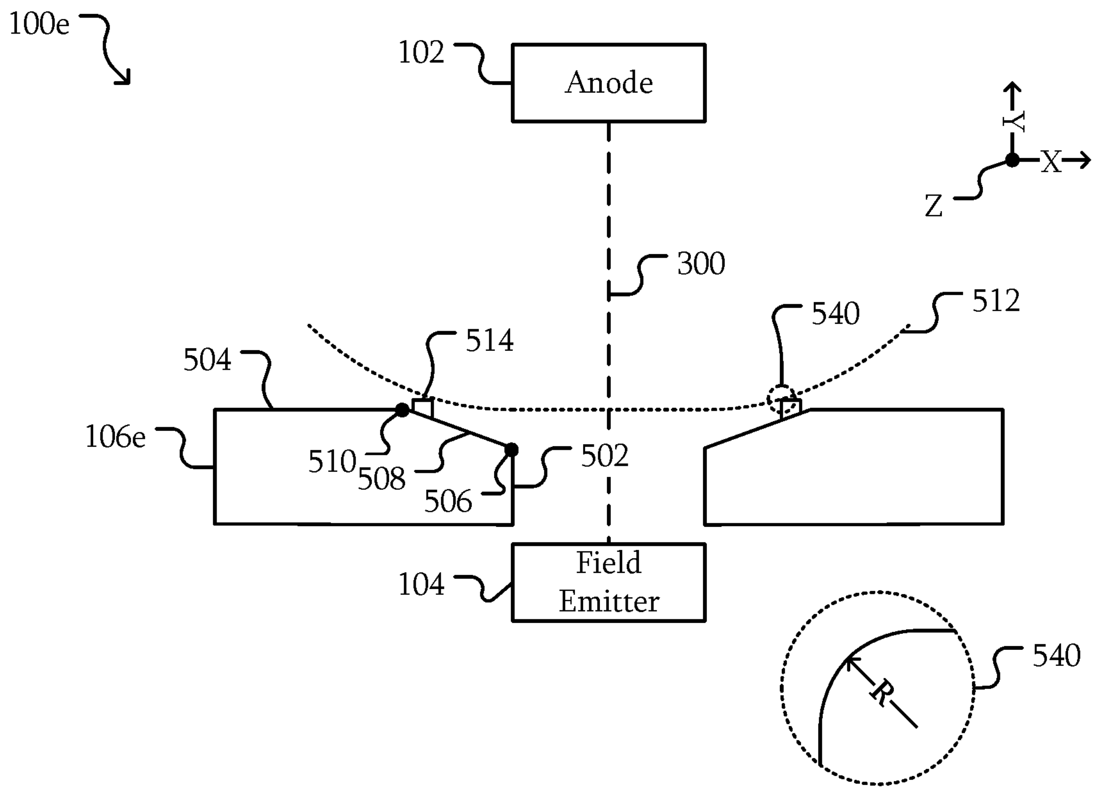
FIG. 5 is a block diagram of an x-ray tube with a focus electrode having a protrusion according to some embodiments.

FIG. 5 is a block diagram of an x-ray tube with a focus electrode having a protrusion according to some embodiments. The x-ray tube 100*e* may be similar to the x-ray tubes 100*a-d* described above. The focus electrode 106*e* may include surfaces 502, 504, and 508 with corresponding locations 506 and 510 similar to surfaces 402, 404, and 408 and locations 406 and 410.

In some embodiments, the focus electrode 106*e* includes a protrusion 514. The protrusion extends from the third surface 508 towards the anode 102. The protrusion 514 includes the part of the focus electrode 106*e* that is closer to the anode 102 than any part of the field emitter 104. Part of the protrusion 514 is at the equidistant line 512 from the anode 102. All other parts of the focus electrode 106*e* are further from the anode 102 than that part of the protrusion 514.

In some embodiments, the protrusion 514 is associated with a local minimum radius. As the radius R, shown in view 540, on a corner of the protrusion 514 decreases, the particular feature becomes sharper. The local radius R may approach zero or approach a sharp corner. With sharper features, smaller radii, or the like, the electric field may be more concentrated in that region. The protrusion 514 may be offset from portions of the focus electrode 106*e* that are closer to the field emitter 104. As a result, the location of a higher electric field strength may be offset from the field emitter 104. The location of the protrusion 514 provides control over the location of a higher electric field strength and hence, the location where an arc may occur.

In some embodiments, the protrusion 514 may be disposed at or closer to the location 510 than the location 506. Thus, the protrusion 514, where an arc may be more likely to occur, may be further away from the field emitter 104.

In some embodiments, points across the third surface 508 other than the protrusion 514 are substantially equidistant from the anode 102. As a result, an electric field strength along those points may be substantially the same. However, as the protrusion 514 is at the same potential as the surface 504, the electric field strength at the protrusion 514 may necessarily be higher.

Although a focus electrode 106*e* that is similar to the focus electrode 106*d* has been used as an example of a focus electrode 106 including a protrusion 514, in other embodiments, other focus electrodes 106 may include a protrusion 514. For example, the focus electrode 106*e* may include a structure similar to focus electrode 106*c* of FIG. 3 but have a protrusion 514 that extends towards the anode 102 from a surface of the focus electrode 106*e*.

Figure 6:
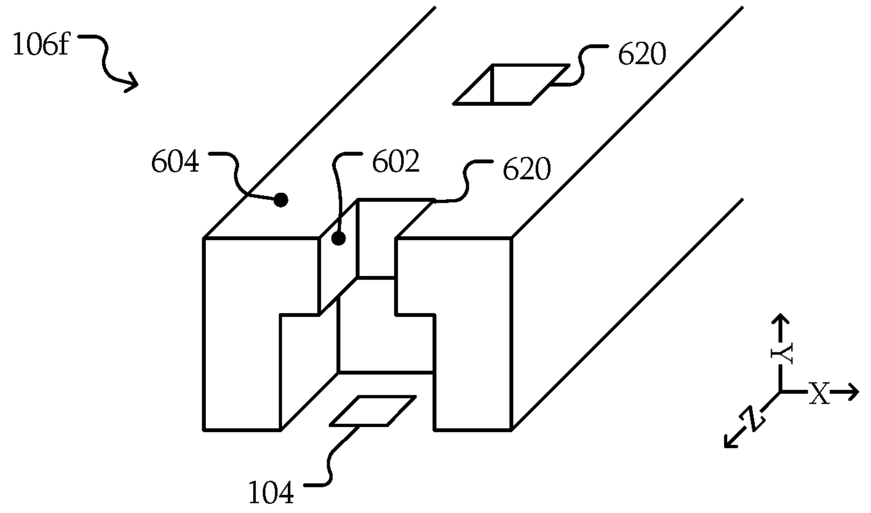
FIG. 6 is a cutaway view of a focus electrode according to some embodiments.

FIG. 6 is a cutaway view of a focus electrode according to some embodiments. As described above, multiple field emitters 104 may be present. The focus electrode 106*f* includes multiple openings 620. Each opening 620 is associated with one of the multiple field emitters 104. For each of the field emitters 104, some point of the focus electrode 106*f* is closer to the anode 102 than that field emitter 104. The opening 620 may have s first surface 602 similar to the first surfaces 302, 402, 502, or the like, described above. The focus electrode 106*f* may include a second surface 604 similar to the second surfaces 304, 404, and 504 described above.

Although the openings 620 are described as being associated on a one-to-one basis with a field emitter, in other embodiments, each opening 620 may be associated with multiple field emitters. However, the focus electrode 106*f* may still have a point that is closer to the anode, such as the anode 102 of FIGS. 1-5, than any of those field emitters 104.

Figure 7:
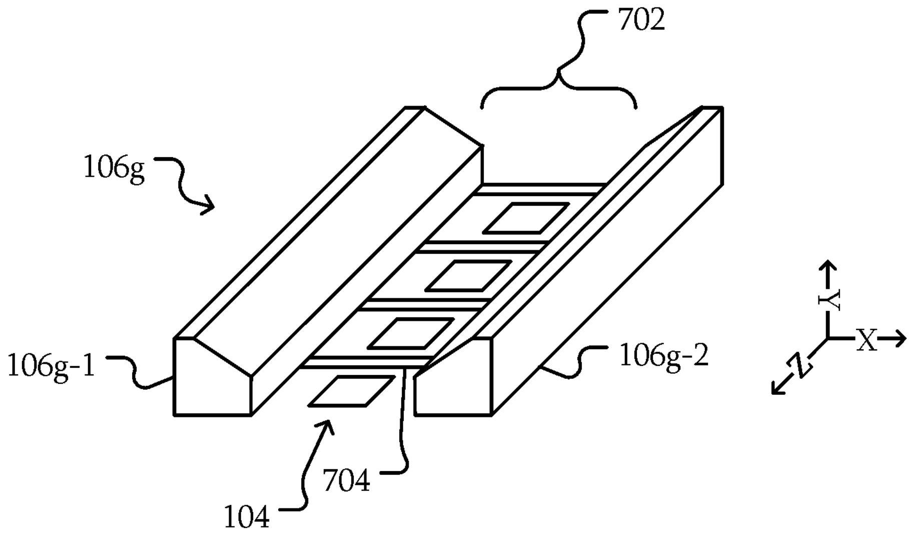
FIG. 7 is a cutaway view of a focus electrode for multiple field emitters according to some embodiments.

FIG. 7 is a cutaway view of a focus electrode for multiple field emitters according to some embodiments. The focus electrode 106*g* includes a single opening 702 formed between portions 106*g*-1 and 106*g*-2. Multiple field emitters 104 are disposed in the single opening 702. In some embodiments, a frame 704 may be disposed between the field emitters 104. In some embodiments, the frame 704 may be grounded or at the same potential as the focus electrode 106*g*. The focus electrode 106*g* may have a cross-section similar to the focus electrodes 106 described above. For example, the focus electrode 106*g* may have a cross-section, may include protrusions, or the like similar to focus electrodes 106*a-e* described above.

Figure 8:
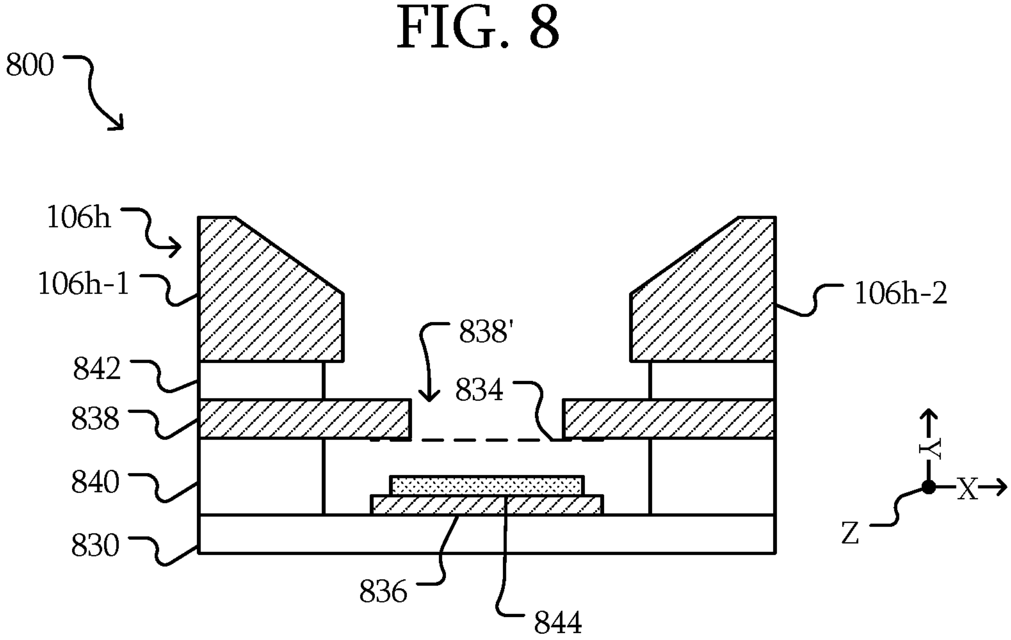
FIG. 8 is a cross-sectional view of a cathode assembly including a focus electrode according to some embodiments.

FIG. 8 is a cross-sectional view of a cathode assembly including a focus electrode according to some embodiments. The cathode assembly 800 includes a substrate 830. The substrate 830 may include a ceramic substrate or other insulating substrate. A conductive layer 836 such as a copper layer is disposed on the substrate 830. An emitter 844, such as carbon nanotubes, nanowires, nanorods, or the like as described above may be disposed on the conductive layer 836. Although one emitter 844 is illustrated, multiple emitters 844 may be present similar to field emitters 104 of FIG. 7. A grid 834 may be disposed over the emitter 844. A voltage may be applied between the conductive layer 836 and the grid 834 to generate electrons from the emitter 844. The grid 834 can be an intercepting type, where the electrons pass through the grid, such a mesh, as illustrated, or the grid can be a non-intercepting type (not shown), where the electrons pass through an open aperture.

A frame 838 similar to the frame 704 of FIG. 7 may be disposed on the substrate 830. The frame 838 may also contribute to the focusing of an electron beam. The frame 838 may provide structural support for other components, such as the grid 834. A spacer (not shown may separate the frame 838 and the grid 834, and the spacer may be conductive or insulating. The frame 838 may include multiple openings 838' associated with multiple emitters 844.

A spacer 840 may separate the frame 838 and the substrate 830. The spacer 840 may be conductive or insulating. The frame 838 may include conductive materials. A second spacer 842 is disposed on the frame 838. The second spacer 842 may be conductive or insulating. A focus electrode 106*h* is disposed on the second spacer 842. The focus electrode 106*h* may be similar to the focus electrodes 106*a-g* described above.

In some embodiments, the focus electrode may include a first portion 106*h*-1 and a second portion 106*h*-2 similar to the portions 106*g*-1 and 106*g*-2 of FIG. 7. Multiple openings 838' may be disposed between the portions 106*h*-1 and 106*h*-2. The portions 106*h*-1 and 106*h*-2 may extend along the emitters 844, for example parallel to the Z direction.

While the spacer 842 may be insulating, in some embodiments, the spacer 842 may be conductive or omitted. Thus, the focus electrode 106*h* and the frame 838 may be at the same potential.

The grid 834 or the frame 838 may provide some protection for the emitter 844 from damage due to arcs; however, due to the relatively close proximity of the grid 834 and the frame 838 to the emitter 844 and the high voltage potential of the arc, the protection may be minimal. For example, the frame 838 may be about 200 micrometers (μm) away from the emitter 844. The proximity to the emitters 838 makes the frame 838 or an attached grid less able to mitigate damage from any molten metal or metal vapor caused by the arc. In addition, a material of the spacer 842 or other structure may be damaged if an arc occurs near the frame 838. Accordingly, moving a location where an arc may occur to further from the emitter 844 and the frame 838 on the focus electrode 106*h* may reduce damage that may occur to the emitter 844, frame 838, spacer 842, or other similar structures due to an arc.

Figure 9:
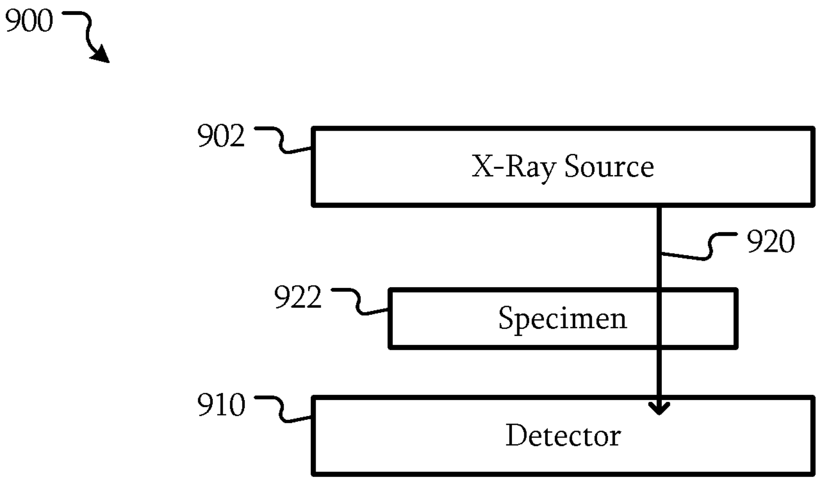
FIG. 9 is a block diagram of a x-ray imaging system according to some embodiments.

FIG. 9 is a block diagram of an x-ray imaging system according to some embodiments. The x-ray imaging system 900 includes an x-ray source 902 and detector 910. The x-ray source 902 may be similar to an x-ray tube 100*a-e* as described above. The x-ray source 902 is disposed relative to the detector 910 such that x-rays 920 may be generated to pass through a specimen 922 and detected by the detector 910. In some embodiments, the detector 910 is part of a medical imaging system, non-destructive testing system, or the like. In other embodiments, the x-ray imaging system 900 may include a portable vehicle scanning system as part of a cargo scanning system.

Some embodiments include an x-ray tube, comprising: a field emitter 104 including an emission surface; an anode 102; and a focus electrode 106, 106*a-h* disposed between the field emitter 104 and the anode 102; wherein: the focus electrode 106, 106*a-h* includes: a first surface 302, 402, 502, 602 that is substantially perpendicular to the field emitter 104 emission surface and nearest to the field emitter 104; a second surface 304, 404, 504, 604 that is axially nearest to the anode 102, wherein the field emitter 104 and the anode 102 form an axis; and a third surface 308, 408, 508 that extends between the first surface 302, 402, 502, 602 and the second surface 304, 404, 504, 604; and a first location 406, 506 on the focus electrode 106, 106*a-h* between the first surface 302, 402, 502, 602 and the third surface 308, 408, 508 is further from the anode 102 than a second location 410, 510 on the focus electrode 106, 106*a-h* between the third surface 308, 408, 508 and the second surface 304, 404, 504, 604.

In some embodiments, the second location 410, 510 on the focus electrode 106, 106*a-h* is further from a center of the field emitter 104 than another part of the focus electrode 106, 106*a-h*.

In some embodiments, the focus electrode 106, 106*a-h* is grounded.

In some embodiments, the focus electrode 106, 106*a-h* further comprises a protrusion 514 extending towards the anode 102.

In some embodiments, the protrusion 514 is closer to the second location 410, 510 on the focus electrode 106, 106*a-h* and the anode 102 than the first location 406, 506 on the focus electrode 106, 106*a-h*.

In some embodiments, the focus electrode 106, 106*a-h* is shaped such that during operation, a point of highest electric field strength is disposed at the second location 410, 510.

In some embodiments, the second surface 304, 404, 504, 604 extends radially and axially away from the first surface 302, 402, 502, 602 relative to the axis.

In some embodiments, the x-ray tube further comprises: a cathode structure including: a substrate wherein the field emitter 104 is disposed on the substrate; a frame disposed on the substrate over the field emitter 104; and the focus electrode 106, 106*a-h* wherein the focus electrode 106, 106*a-h* is disposed on the frame.

In some embodiments, the field emitter 104 is one a multiple field emitter 104*s* disposed on the substrate; the frame includes multiple openings, each opening corresponding to one of the multiple field emitter 104*s*; the focus electrode 106, 106*a-h* includes a first portion and a second portion; and the openings of the frame are disposed between the first portion and the second portion.

In some embodiments, points across the second surface 304, 404, 504, 604 are substantially equidistant from the anode 102.

Some embodiments include an x-ray tube, comprising: a cathode structure 800 including a field emitter 104; an anode 102; and a focus electrode 106, 106*a-h* disposed between the field emitter 104 and the anode 102; wherein the focus electrode 106, 106*a-h* is disposed relative to the field emitter 104 and the anode 102, and the focus electrode 106, 106*a-h* is shaped such that during operation, a point of highest electric field strength on the cathode structure is closer to the focus electrode 106, 106*a-h* than the field emitter 104.

In some embodiments, the point of highest electric field strength is further from a center of the field emitter 104 than another part of the focus electrode 106, 106*a-h*.

In some embodiments, the focus electrode 106, 106*a-h* is grounded.

In some embodiments, the field emitter 104 and the anode 102 form an axis; and the focus electrode 106, 106*a-h* comprises: a first surface 302, 402, 502, 602 extending substantially parallel to the axis; a second surface 304, 404, 504, 604 extending radially away from the first surface 302, 402, 502, 602 relative to the axis.

In some embodiments, a first location on the focus electrode 106, 106*a-h* is between the first surface 302, 402, 502, 602 and the second surface 304, 404, 504, 604; and the focus electrode 106, 106*a-h* is shaped such that during operation, a point of highest electric field strength is disposed at the first location.

In some embodiments, the field emitter 104 and the anode 102 form an axis; and the focus electrode 106, 106*a-h* comprises: a first surface 302, 402, 502, 602 extending substantially parallel to the axis; a second surface 304, 404, 504, 604 extending radially away from the first surface 302, 402, 502, 602 relative to the axis; a third surface 308, 408, 508 extending radially and axially away from the first surface 302, 402, 502, 602 relative to the axis towards the second surface 304, 404, 504, 604; and a first location 306, 406, 506 on the focus electrode 106, 106*a-h* between the first surface 302, 402, 502, 602 and the third surface 308, 408, 508; and a second location 410, 510 on the focus electrode 106, 106*a-h* is between the third surface 308, 408, 508 and the second surface 304, 404, 504, 604.

In some embodiments, the focus electrode 106, 106*a-h* is shaped such that during operation, a point of highest electric field strength is disposed at the second location 410, 510.

In some embodiments, points across the second surface 304, 404, 504, 604 are substantially equidistant from the anode 102.

Some embodiments include an x-ray tube, comprising: means for emitting electrons towards an anode; and means for focusing electrons emitted from the means for emitting electrons towards the anode, comprising: means for increasing an electric field strength at the means for focusing electrons beyond an electric field strength at the means for emitting electrons.

Examples of the means for emitting electrons towards an anode include the cathode structure 800, the field emitter 104, the grid 834, or the like. In an example, the means for emitting electrons towards an anode can include at least three field emitters 104.

Examples of the means for focusing electrons emitted from the means for emitting electrons towards the anode include the focus electrode 106, 106*a-h*, and the frame 704, 838.

Examples of the means for increasing an electric field strength at the means for focusing electrons beyond an electric field strength at the means for emitting electrons include surfaces 302, 402, 502, 602, 408, 508, locations or edges 406, 506, the protrusion 514, or the like In some embodiments, the means for focusing electrons further comprises: means for positioning a point of maximum electric field strength on the means for focusing electrons further from the means for emitting electrons than a closest part of the means for focusing electrons to the means for emitting electrons. Examples of the means for positioning a point of maximum electric field strength on the means for focusing electrons further from the means for emitting electrons than a closest part of the means for focusing electrons to the means for emitting electrons include the location 410 and 510, the protrusion 514, or the like.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An x-ray tube, comprising:
a field emitter including an emission surface;
an anode; and
a focus electrode disposed between the field emitter and the anode;
wherein:
the focus electrode includes:
a first surface that is substantially perpendicular to the field emitter emission surface and nearest to the field emitter;
a second surface that is axially nearest to the anode, wherein the field emitter and the anode form an axis; and
a third surface that extends between the first surface and the second surface;
a first location on the focus electrode between the first surface and the third surface is further from the anode than a second location on the focus electrode between the third surface and the second surface; and
the focus electrode further comprises a protrusion extending towards the anode.

2. The x-ray tube of claim 1, wherein:
the second location on the focus electrode is further from a center of the field emitter than another part of the focus electrode.

3. The x-ray tube of claim 1, wherein:
the focus electrode is grounded.

4. The x-ray tube of claim 1, wherein:
the protrusion is closer to the second location on the focus electrode and the anode than the first location on the focus electrode.

5. The x-ray tube of claim 1, wherein:
the focus electrode is shaped such that during operation, a point of highest electric field strength is disposed at the second location.

6. The x-ray tube of claim 1, wherein:
the second surface extends radially and axially away from the first surface relative to the axis.

7. The x-ray tube of claim 1, further comprising:
a cathode structure including:
a substrate wherein the field emitter is disposed on the substrate;
a frame disposed on the substrate over the field emitter; and
the focus electrode wherein the focus electrode is disposed on the frame.

8. The x-ray tube of claim 7, wherein:
the field emitter is one of multiple field emitters disposed on the substrate;
the frame includes multiple openings, each opening corresponding to one of the multiple field emitters;
the focus electrode includes a first portion and a second portion; and
the openings of the frame are disposed between the first portion and the second portion.

9. The x-ray tube of claim 1, wherein:
points across the second surface are substantially equidistant from the anode.

10. An x-ray tube, comprising:
a cathode structure including a field emitter;
an anode; and a focus electrode disposed between the field emitter and the anode, the focus electrode comprising a protrusion extending towards the anode;
wherein the focus electrode is disposed relative to the field emitter and the anode, and the focus electrode is shaped such that during operation, a point of highest electric field strength on the cathode structure is closer to the focus electrode than the field emitter and disposed on the protrusion of the focus electrode.

11. The x-ray tube of claim 10, wherein:
the point of highest electric field strength is further from a center of the field emitter than another part of the focus electrode.

12. The x-ray tube of claim 10, wherein:
the focus electrode is grounded.

13. The x-ray tube of claim 10, wherein:
the field emitter and the anode form an axis; and
the focus electrode comprises:
a first surface extending substantially parallel to the axis;
a second surface extending radially away from the first surface relative to the axis.

14. The x-ray tube of claim 13, wherein:
a first location on the focus electrode is between the first surface and the second surface; and
the focus electrode is shaped such that during operation, a point of highest electric field strength is disposed at the first location.

15. The x-ray tube of claim 10, wherein:
the field emitter and the anode form an axis; and
the focus electrode comprises:
a first surface extending substantially parallel to the axis;
a second surface extending radially away from the first surface relative to the axis;
a third surface extending radially and axially away from the first surface relative to the axis towards the second surface; and
a first location on the focus electrode between the first surface and the third surface; and
a second location on the focus electrode is between the third surface and the second surface.

16. The x-ray tube of claim 15, wherein:
the focus electrode is shaped such that during operation, a point of highest electric field strength is disposed at the second location.

17. The x-ray tube of claim 13, wherein:
points across the second surface are substantially equidistant from the anode.

18. An x-ray tube, comprising:
means for emitting electrons towards an anode; and
means for focusing electrons emitted from the means for emitting electrons towards the anode, comprising:
means for increasing an electric field strength at the means for focusing electrons beyond an electric field strength at the means for emitting electrons including a protrusion extending towards the anode.

19. The x-ray tube of claim 18, wherein the means for focusing electrons further comprises:
means for positioning a point of maximum electric field strength on the means for focusing electrons further from the means for emitting electrons than a closest part of the means for focusing electrons to the means for emitting electrons.

20. An x-ray tube, comprising:
a plurality of field emitters, each field emitter including an emission surface;

an anode;

a focus electrode disposed between at least one of the plurality of field emitters and the anode; and a cathode structure including:

a substrate wherein the at least one of the field emitters is disposed on the substrate;

a frame disposed on the substrate over the at least one of the field emitters; and the focus electrode disposed on the frame wherein:

the focus electrode includes:

a first surface that is substantially perpendicular to an emission surface of the at least one of the field emitters and nearest to the at least one of the field emitters;

a second surface that is axially nearest to the anode, wherein the at least one of the field emitters and the anode form an axis; and a third surface that extends between the first surface and the second surface;

a first location on the focus electrode between the first surface and the third surface is further from the anode than a second location on the focus electrode between the third surface and the second surface;

the frame includes multiple openings, each opening corresponding to one of the field emitters;

the focus electrode includes a first portion and a second portion; and the openings of the frame are disposed between the first portion and the second portion.

* * * * *